(12) United States Patent
Kress

(10) Patent No.: US 8,967,928 B2
(45) Date of Patent: Mar. 3, 2015

(54) INTERFACE ELEMENT

(75) Inventor: Dieter Kress, Aalen (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 2058 days.

(21) Appl. No.: 11/990,482

(22) PCT Filed: Aug. 19, 2006

(86) PCT No.: PCT/EP2006/008192
§ 371 (c)(1),
(2), (4) Date: Sep. 7, 2010

(87) PCT Pub. No.: WO2007/022930
PCT Pub. Date: Mar. 1, 2007

(65) Prior Publication Data
US 2011/0052336 A1 Mar. 3, 2011

(30) Foreign Application Priority Data
Aug. 22, 2005 (DE) .......... 10 2005 040 587

(51) Int. Cl.
 B23B 31/00 (2006.01)
 B23B 29/034 (2006.01)
 B23B 29/04 (2006.01)
 B23B 31/11 (2006.01)

(52) U.S. Cl.
 CPC ......... B23B 29/03428 (2013.01); B23B 29/046 (2013.01); B23B 31/008 (2013.01); B23B 31/1107 (2013.01); B23B 2231/48 (2013.01); B23B 2265/12 (2013.01)
 USPC .......... 409/234; 407/11; 408/239 R; 403/383; 403/359.6

(58) Field of Classification Search
 USPC ........ 407/11, 34, 99, 120; 403/348, 350, 361, 403/383, 359.6, 359.1; 408/239 R, 238, 408/239 A; 409/234
 See application file for complete search history.

(56) References Cited

U.S. PATENT DOCUMENTS

| 3,860,209 | A | * | 1/1975 | Strecker ........................ 410/116 |
| 4,557,642 | A | | 12/1985 | Dudas et al. |
| 4,748,879 | A | | 6/1988 | von Haas |

(Continued)

FOREIGN PATENT DOCUMENTS

| CA | 2340374 | | 2/2000 |
| DE | 2025254 | A1 | 4/1971 |

(Continued)

OTHER PUBLICATIONS

English Translation of the International Preliminary Report on Patentability Chapter II, IPEA, Rijswijk, NL, established Dec. 27, 2007.

(Continued)

Primary Examiner — Sunil K Singh
Assistant Examiner — Sara Addisu
(74) Attorney, Agent, or Firm — Harness, Dickey & Pierce, P.L.C.

(57) ABSTRACT

An interface element between a first tool element and a second tool element includes a projection on one of the first and second tool elements and a cavity that receives the projection on the other of the first and second tool element. The cavity includes inner contours which are designed to receive polygonal and/or stellate projections.

18 Claims, 3 Drawing Sheets

(56) References Cited

U.S. PATENT DOCUMENTS

Figure 6:
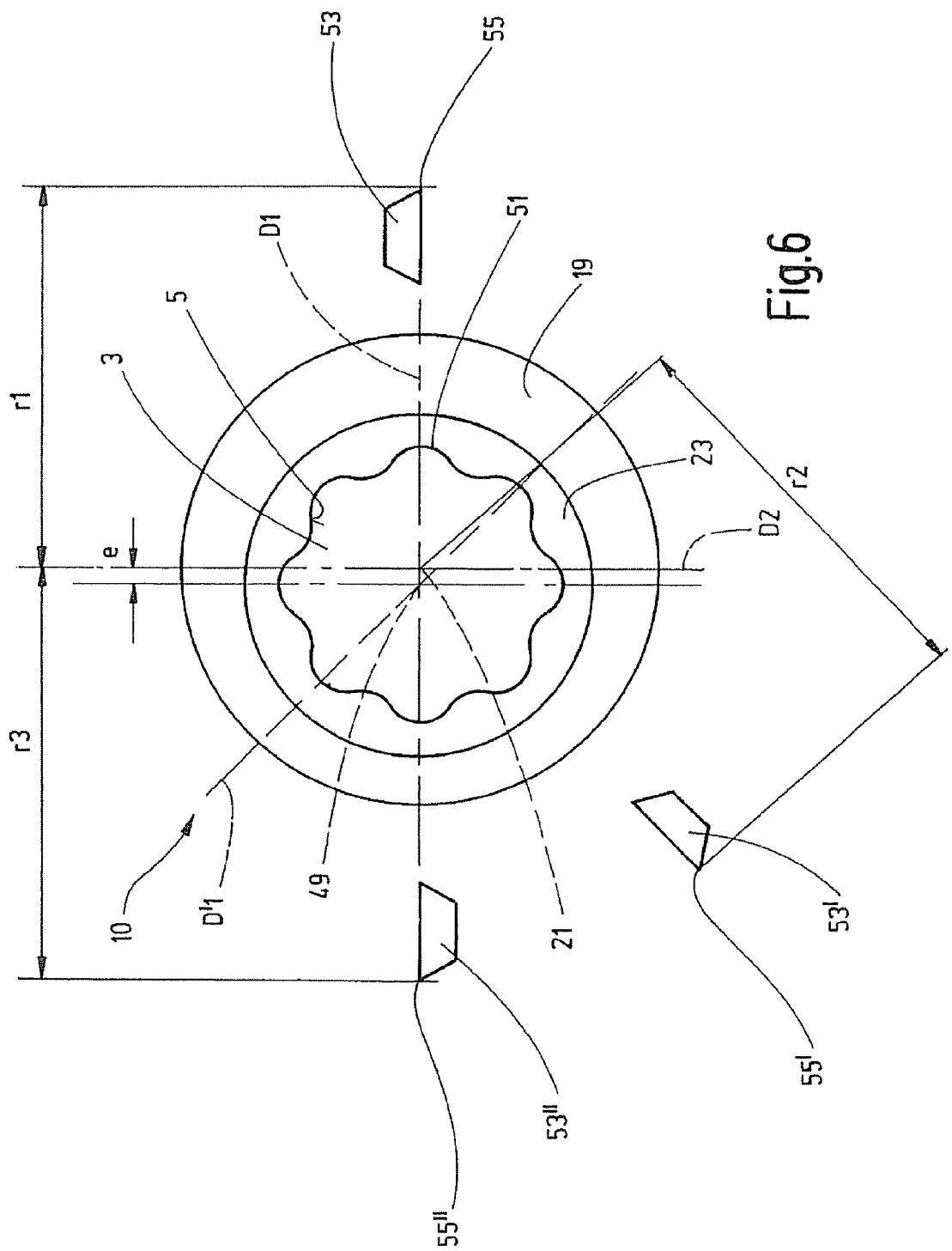

| | | | |
|---|---|---|---|
| 4,834,597 A * | 5/1989 | Andersson et al. | 409/234 |
| 4,934,883 A | 6/1990 | Andersson et al. | |
| 4,970,922 A * | 11/1990 | Krivec | 81/460 |
| 5,026,224 A * | 6/1991 | Andersson et al. | 409/234 |
| 5,163,790 A * | 11/1992 | Vig | 408/57 |
| 5,213,347 A | 5/1993 | Rulon et al. | |
| 5,435,680 A * | 7/1995 | Schuster | 411/404 |
| 5,551,811 A * | 9/1996 | Satran et al. | 407/40 |
| 5,607,263 A * | 3/1997 | Nespeta et al. | 407/61 |
| 5,800,098 A * | 9/1998 | Satran et al. | 407/31 |
| 6,276,879 B1 * | 8/2001 | Hecht | 409/234 |
| 6,623,202 B2 * | 9/2003 | Hansson et al. | 403/359.6 |
| 6,626,067 B1 * | 9/2003 | Iwinski et al. | 81/121.1 |
| 6,632,057 B1 * | 10/2003 | Fauchet | 411/403 |
| 6,896,450 B2 * | 5/2005 | Rothenstein | 408/59 |
| 6,902,355 B2 | 6/2005 | Kress et al. | |
| 7,121,771 B2 * | 10/2006 | Englund | 407/103 |
| 7,488,142 B2 * | 2/2009 | Englund et al. | 407/107 |
| 7,527,459 B2 * | 5/2009 | Stojanovski | 409/234 |
| 7,611,311 B2 * | 11/2009 | Kakai et al. | 407/54 |
| 8,042,437 B2 * | 10/2011 | Maier et al. | 82/161 |
| 8,123,524 B2 * | 2/2012 | Anitua Aldecoa | 433/173 |
| 8,291,795 B2 * | 10/2012 | Hughes et al. | 81/460 |
| 8,708,611 B2 * | 4/2014 | Marshansky | 407/47 |
| RE44,915 E * | 5/2014 | de Souza | 408/227 |
| 2002/0003985 A1 | 1/2002 | Hansson et al. | |
| 2002/0067965 A1 | 6/2002 | Kress et al. | |
| 2004/0081523 A1 | 4/2004 | Vasudeva et al. | |
| 2004/0154838 A1 | 8/2004 | Gaul | |
| 2004/0213642 A1 | 10/2004 | Pantzar | |
| 2005/0254890 A1 * | 11/2005 | Schulz et al. | 403/359.1 |
| 2006/0266168 A1 * | 11/2006 | Pacheco, Jr. | 81/460 |
| 2006/0278049 A1 * | 12/2006 | Baynham | 81/436 |
| 2008/0006126 A1 * | 1/2008 | Hsieh | 81/121.1 |
| 2012/0039676 A1 * | 2/2012 | Marshansky | 407/48 |

FOREIGN PATENT DOCUMENTS

| | | |
|---|---|---|
| DE | 3312990 A1 | 10/1984 |
| DE | 3532891 A1 | 3/1987 |
| DE | 694 05 176 T2 | 1/1998 |
| DE | 29919851 U1 | 2/2000 |
| DE | 100 48 910 A1 | 5/2002 |
| DE | 699 13 159 T2 | 5/2004 |
| EP | 0294348 A1 | 12/1988 |
| EP | 0742065 A1 | 11/1996 |
| EP | 1193011 A1 | 4/2002 |
| EP | 1413374 A | 4/2004 |
| EP | 1424152 A | 6/2004 |
| GB | 1255494 A | 12/1971 |
| GB | 1309732 A | 3/1973 |
| GB | 2137124 A | 10/1984 |
| JP | 63-103904 | 7/1988 |
| WO | 9419132 A | 9/1994 |
| WO | 01/87525 A1 | 11/2001 |
| WO | 0187525 A | 11/2001 |
| WO | 02064295 A2 | 8/2002 |
| WO | 2004/067213 A | 8/2004 |

OTHER PUBLICATIONS

Japanese Office Action for parallel application JP2008-527388, mailed Nov. 15, 2011.

* cited by examiner

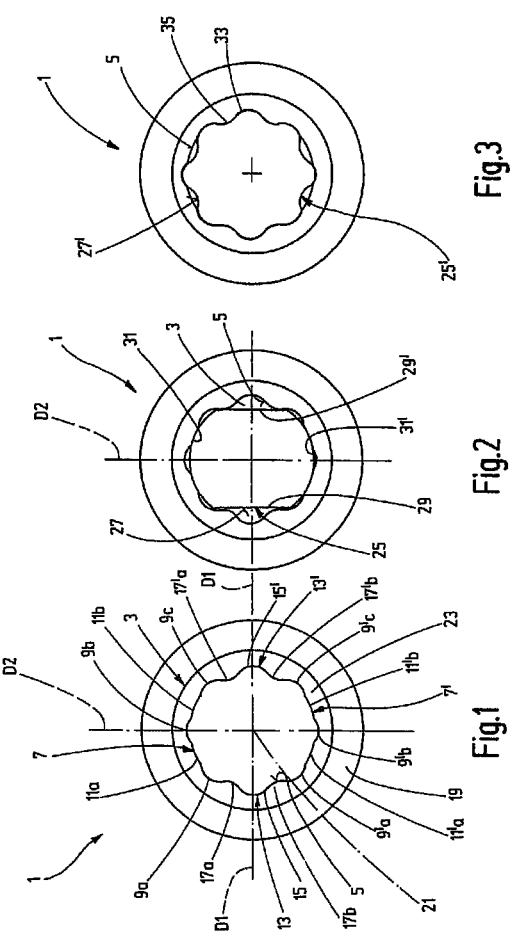

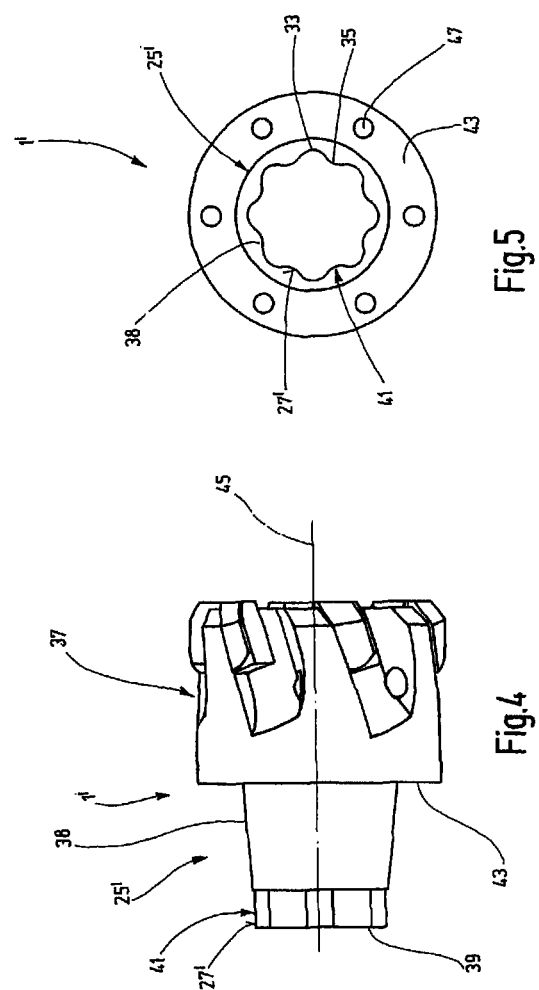

US 8,967,928 B2

INTERFACE ELEMENT

CROSS-REFERENCE TO RELATED APPLICATIONS

This application is 371 National Stage of International Application No. PCT/EP2006/008192, filed Aug. 19, 2006. This application claims priority to German Patent Application 10 2005 040 587.8, filed Aug. 22, 2005. The disclosures of the above applications are herein expressly incorporated by reference.

The invention relates to an interface between a first tool element and a second tool element according to the preamble of claim 1.

The term interface describes connecting points between tool elements, wherein the tool element can be parts used for machining workpiece surfaces or adapters, intermediate parts and the like. The term tool element also refers to a machine spindle, whereon tool elements can be mounted.

Interfaces in accordance with the above-mentioned kind are commonly known. They are used mainly for the connection of two machine elements in a way, such that a torque can be transmitted over the interface. Tool couplings, for connecting a tool head and a tool holder with an anti-torsion element and an axial tensioning are commonly known (DE 35 32 891 A1).

An interface of that kind is used to connect two tool parts in a way, such that a torque can be transmitted. Said connection, should also take into consideration, that the tool elements can be automatically clamped and handled. To secure a transmission of a torque, that is to provide an anti-slip, it is proposed to provide at least one driver element. The option, to realize a polygonal connection between the tool elements, for example a multi-tooth profile, is also discussed. It has been shown, that no sufficient torque can be transmitted in said way, and the exact alignment of the tool elements assigned to the interface can not be provided.

The task of the invention is to create an interface between a first and second tool element, not having said disadvantages.

To solve said task, an interface between a first and second tool element is proposed, comprising the characteristics mentioned in claim 1. The interface is configured in a way, such that one of the tool elements has a projection and the other one has a cavity receiving the projection. The interface is characterized by the projection having an inner contour, being designed as polygonal and/or stellate projections. An important aspect is, that the inner contour comprises curved regions providing an optimum transmission of torque, wherein the tool element associated with the interface engage each other in a way, such that no open notch positions result. Said open notch positions could damage the interface and furthermore the exact alignment of the tool parts associated with each other would be harder. The interface is characterized particularly by the curved regions of the inner contour of the cavity being designed in a way, such that different projections can be received and exactly maintained. Polygonal or stellate projections can be inserted into the cavities, considerably increasing the range of use of the tool element having the cavity. The cavity is not only designed for a single, specially designed projection, but differently designed projections can be inserted into the cavity and can be exactly maintained.

A preferred embodiment of the interface is characterized by the cavity having an inner contour with a first region having adjacent—looked upon from the inside—, concave sections, and a second region, having at least one concave first section and at least one adjacent convex second section. By combining the design of said two regions, it is possible to insert projections into the cavity being mainly polygonal, and also projections having a stellate outer contour.

In the following, a "polygonal" projection is referred to a projection with an outer contour having only plane surfaces being adjacent to each other with different angles in a way, such that edges are formed. An outer contour is also referred to as polygonal, when several surfaces are curved to the outside in a convex way and are adjacent to plane surfaces. Furthermore, plane surfaces and concave surfaces or convex and concave surfaces can be chosen for achieving the outer contour of a polygonal projection.

In the following, a "stellate" projection is referred to a projection having spaced projections, the flanks thereof being plane or curved. They can be recessed concavely inwards or can be curved convexly outwards. The end of a stellate projection can be pointy, that is, can be formed by two adjacent surfaces forming an acute angle, or are in a radius. The radius of the flanks of the projection may correspond to the radius of the end of said projection.

DRAWINGS

Further embodiments can be found in the sub claims.
The invention is described in the following with the drawings:

FIG. 1 shows a top view of a first embodiment of a first tool element with a cavity;

FIG. 2 a top view of the first tool element according to FIG. 1 with the contour of a first embodiment of a projection of a second tool element;

FIG. 3 a top view of the first tool element according to FIG. 1 with the contour of a second embodiment of a projection of a tool element;

FIG. 4 a side view of a second tool element;

FIG. 5 a top view of the projection of the second tool element according to FIG. 4; and FIG. 6 a top view of a second embodiment of a first tool element with a cavity.

DETAILED DESCRIPTION

FIG. 1 shows a top view of a first tool element 1 of an interface with a cavity 3, designed to receive a projection of a second tool element, not shown here, and to realize a rotationally fixed connection between the first tool element 1 and the second tool element.

The cavity 3 extends into the image plane of FIG. 1 and comprises two sections, one being designed primarily cylindrical, and one, having a conical inner plane, extending—in FIG. 1—towards the viewer. The first section, having an inner contour 5, is first referred to now.

The inner contour 5 comprises—looked upon from the circumferential direction—different designed regions, to be able to receive polygonal and/or stellate projections. The top of FIG. 1 shows a inner contour 5 of a first region 7, comprising—looked upon from the inside—first concave sections 9a, 9b and 9c and second concave sections 11a and 11b. Underneath a diameter line D1 running horizontally, is a first region 7' being in symmetry to said diameter line, comprising respectively designed first sections 9a', 9'b and 9'c, wherein concave second sections 11'a and 11'b are arranged in between.

Between said first regions 7 and 7' is at least a second region 13, comprising at least a concave first section 15 and at least an adjacent convex second section. The second region 13 is designed symmetrically to the horizontal diameter line D1 is this disclosed embodiment, such that on both sides—looked upon from the inside—a concave first section 15 is followed by two convex second sections 17a and 17b.

Symmetrically to a vertical diameter line D2, being perpendicular on the first diameter line D1, is a second region 13' is provided, comprising a concavely designed first section 15', wherein convex second sections 17'a and 17'b are following on both sides.

The embodiment described in FIG. 1 shows the first regions 7 and 7' being symmetrically to the perpendicular diameter line D2.

The top view of the end of the first tool element 1 facing the viewer shows the front region thereof comprising a planar surface 19, being designed as a continuous annular surface. The planar surface 19 lies in a perceived plane, upon which the center axis 21 of the first tool element 1 sits perpendicular. If the first tool element 1 is connected to a machine tool, or if the first tool element 1 represents a machine spindle, the center axis 21 forms also the rotational axis of said tool element.

The planar surface 19 comprises a cavity region 23, belonging to the second section of the cavity 3, running into the image plane of FIG. 1. It extends into the first cylindrical section of the cavity 3.

The cavity 3 in the first tool element 1 thus comprises two sections, namely a cylindrical cavity region with the inner contour 5, as described above, and a cavity region 23, tapering conically into the image plane of FIG. 1. It is pointed out, that also interfaces are conceivable, wherein the cavity region 23 does not have a surrounding conical sectional inner surface, but is cylindrical.

FIG. 2 shows the first tool element explained with FIG. 1, with the inner contour 5 and the cavity region 23 comprising cavities 3. To simplify, reference to all other reference numbers in FIG. 1 is omitted. As FIG. 2 shows the identical front view of the first tool element, we refer to the description of FIG. 1.

The only difference of the depiction according to FIG. 2 compared to FIG. 1 is, that in the cylindrical section of the cavity 3 having the above-mentioned inner contour 5, the contour of a first embodiment of a projection 25 is marked, the polygonal outer contour 27 is designed according to the above-mentioned definition. The embodiment depicting the projection 25 comprises an outer contour 27 with two perpendicular first sections 29 and 29', being symmetrically arranged at a distance to the vertical diameter line D2 and are adjacent to two convex second sections 31, 31' of the outer contour 27, being symmetrically arranged to the horizontal diameter line D1. The second sections 31, 31' form cylindrical partial surfaces, wherein the radius of curvature is essentially the same as the radius of curvature of the second sections 11a, 11b and 11'a, 11'b of the first regions 7, 7' of the inner contour 5. The distance of said second sections 31, 31' of the outer contour 27 to the horizontal diameter line D1 is chosen in a way, such that the outer contour 27 of the projection 25 fits precisely in the region of the convex sections 31, 31' to the concave sections 11a, 11b and 11'a, 11'b of the inner contour 5.

The width of the projection 25 in the region of the first sections 29, 29' that run perpendicular to each other, is chosen such that they essentially fit precisely to the convex second section 17a, 17b and 17'a, 17'b of the second region 13, 13' of the inner contour 5.

FIG. 2 shows, that the projection 25 is supported securely on the top and bottom by the inner contour 5 of the cylindrical projection region, and that the plane-parallel second sections 29, 29' thereof are supported securely in the second region 13, 13' of the inner contour 5, that is by the concave second sections 17a, 17b and 17'a, 17'b.

The specially designed inner contour 5 of the cylindrical projection region in the first tool element 1, takes up at least regions of the projection 25 with a small clearance, wherein a high torque is transferable.

The indicated projection in FIG. 2 is a known design.

FIG. 2 shows only a cylindrical projection region of the projection 25, being located in the cylindrical projection region of the tool element in the region of the inner contour 5. FIG. 2 does not show the projection 25 comprising also a projection region extending conically to the viewer, the cone-enveloped-shaped inner surface of the outer wall laying against the inner wall of the conical projection region 23 of the cavity 3 of the tool element 1.

FIG. 3 shows a top view of the first tool element 1, which was explained in FIG. 1. Therefore, the reference numbers indicated in FIG. 1 are not repeated in FIG. 3. We refer to the description of FIG. 1 in that connection. In the cylindrical projection region with the inner contour 5, the outer contour 27' of a stellate-shaped projection 25' is marked, showing uniformly designed, being spaced at the same distance from each other in the circumferential direction, projection 15' with convex projections 33, wherein concave recesses 35 are located in between. The projections 33 and recesses 35 comprise the same curvature radii, wherein the projections 33 and the recesses 35 are designed symmetrically to a perceived center plane.

The projections comprise convex, curved to the outside, flanks and a convex end. The flanks and the end have the same curvature radius.

FIG. 3 shows, that the outer contour 27' of the projection 25' is in contact with the second region 13 and 13' of the inner contour 5, also in the regions of the first sections 9a, 9b, 9c and 9'a, 9'b and 9'c of the first region 7 and 7'.

The outer contour 27' of the projection 25 is only in contact with the second sections 11a, 11b, and 11'a, 11'b of the first region 7 and 7' and not with the inner contour 5 of the projection 3.

Due to the almost complete planar contact of the outer contour 27' of the projection 25' with the inner contour 5 of the cavity 3, a very high torque between both tool elements of the interface can be transmitted.

The first tool element 1, being depicted in FIGS. 1 to 3, distinguishes itself mainly, by the inner contour 5 being designed in a way, such that projections 25 with a polygonal outer contour 27 as well as projections 25' with a stellate outer contour 27' can be inserted into the cavity 3 and are in full contact at least partially with the inner contour 5, such that a higher torque can be transmitted. It is obvious, that in the embodiment of the projection 25' a higher torque can be transmitted, that is the case with a polygonal projection 25 according to FIG. 2.

According to the explanations in relation to FIGS. 1 to 3, it is obvious, that the second sections 11a, 11b and 11'a, 11'a of the first regions 7 and 7' do not necessarily have to be concave. It would be possible to provide fully contacting regions here, at least, when the outer contour 27 of the projection 25 would be adapted accordingly. The second sections 31, 31' would have to be modified in that case. They could not be designed continually convex, but would have to have fully contacting regions at the appropriate spot.

It shows furthermore, that the use of a stellate projection 25 with an outer contour 27', as explained in FIG. 3, could be used in said case. It shows, that between the regions 11a, 11b and 11'a, 11'b of the first regions 7 and 7' and the outer contour 27' of the projection 25', a gap present. Accordingly, it would also be possible, to design said regions 11a, 11b and 11'a, 11'b as flat surfaces and not convex.

Furthermore, it becomes obvious from FIG. 3, that the second regions 11a, 11b and 11'a, 11'b could also be designed in a convex manner—regarding the inner contour 5, looked upon from the inside—, such that the inner contour 5 would be designed in a stellate way, and said regions would be in full contact with the outer contour 27' of the projection 25'. The gaps seen in FIG. 3 between the inner contour 5 and the outer contour 27' of the projection 25' could be omitted therefore. Due to the complete surface contact of the outer contour 27' of the projection 25' with the inner contour 5 of the cavity 3 of the tool element 1, a very high torque could be transmitted.

FIG. 4 shows a side view of a second tool element 1'. For the design of an interface, it is not important how the second tool element is configured. It can be a spacer, an adapter or, as shown here, a tool head 37, comprising at least one, in this case a plurality of geometrically defined blades being part of knife plates. As the design of the second tool element is not important for the realization of the interface, the exact embodiment of the tool head 37 is not further explained here. It is essential, that the tool head 37 comprises a projection 25'. Said tool head comprises a conically tapered projection region 39 with a cone-envelope-shaped outer surface, being designed in a way, such that it is in contact with the conically designed projection region 23 of the cavity 3 of the first tool element 1.

At the end 39 opposite of the tool head 37, the projection 25' comprises a cylindrical projection region 41, the outer contour 27' thereof being stellate, as already explained in FIG. 3.

The largest outer diameter of the projection 25' is smaller than the outer diameter of the tool head 37. Thus a ring-shaped planar surface 43, surrounding the projection 25', is designed, laying in one plane, the center axis 45 of the second tool element 1 being perpendicular thereto.

When the interface is assembled, the cylindrical projection region 41 with the outer contour 27' is engaged with the cylindrical projection region, comprising the inner contour 5, as explained in FIGS. 1 to 3. Accordingly, the conical projection region 38 is in contact with the conical projection region 23 of the cavity 3 of the first tool element 1. Eventually, the planar surface 19 of the first tool element 1 is in contact with the planar surface 43 of the second tool element 1', such that the tool elements 1, 1' of the interface are exactly mutually aligned.

FIG. 5 shows a top view of the projection 25' of the second tool element 1' according to FIG. 4. The same parts have the same reference numbers. Thus we refer to the description of FIG. 4 and FIG. 3, where the outer contour 27' of a projection 25' was already described.

It can be clearly seen, that according to the embodiment according to FIG. 5, a number of coolant-/lubricant channels 47 open into the planar surface 43. Respectively, such coolant-/lubricant channels are intended for the planar surface 19 of the first tool element 1, in case a lubrication of the active blades of the tool head 37 is desired. They are not shown in FIGS. 1 to 3 for simplification reasons.

FIG. 5 shows the conical projection region 38 and the cylindrical projection region 41 of the projection 25', comprising a number of irregularly spaced projections 33 in the circumferential direction, having concave recesses 35 in between. As the design possibilities of projections 33 and recesses 35 were already discussed in FIG. 3, a repetition is herewith omitted.

It is obvious, that the projection 25' of the second tool element 1' fits without problem into the cavity 3 of the first tool element 1 and lays there flat against the inner contour 5 of the cavity 3,—except against the second sections 11a, 11b, 11'a, 11'b—, as the outer contour 27' is mainly designed complementary to the inner contour 5 of the cavity 3. Therefore, a maximum torque between both tool elements 1, 1' assigned to an interface can be transmitted. As mentioned above, the inner contour 5 can also be stellate. In that case the projection 25' is in full contact with the inner contour 5 of the cavity 3.

FIG. 6 shows a top view of a second embodiment of a first tool element 10. Similar and functionally equal parts are marked with similar reference numerals, thus we refer to the above description.

The first tool element 10 comprises a cavity 3, having a stellate inner contour 5.

The only difference to the first tool element 1 according to FIGS. 1 to 3 is, that the cavity 3 is arranged eccentrically. The center 49 of the cavity 3 is at a distance 3, arranged to the left side of the perpendicular diameter line D2, but lays, like the center axis 21 of the first tool element 1 on the horizontal diameter line D1.

According to the embodiment of FIG. 6, the cavity 3 can comprise a cylindrical projection region with the inner contour 5 and a conical projection region 23, extending to the viewer from FIG. 6 and being surrounded by a planar surface 19. Said planar surface lays in a perceived plane, the center axis 21 of the first tool element 10 being perpendicular on it. As the cavity 3 is arranged eccentrically, the width of the planar surface 19—different from the embodiment according to FIGS. 1 to 3—is not constant.

Coolant-/lubricating channels may open into the planar plane 19, as explained with the planar surface 43 of the second tool element 1' in FIG. 5.

A second tool element 1', not shown here, coacting with the first tool element 10, is preferably designed in a way, such that the projection 25' thereof is arranged centrically to the center axis 45 of the second tool element 1'.

Due to the eccentric arrangement of the cavity 3 in the first tool element 10, the following effect is obtained: The second tool element 1' can be inserted into the cavity 3 in a way, such that the horizontal diameter line of the inserted second tool element 1' is aligned the same way as the diameter line D1 of the first tool element 10, as shown in FIG. 6. Due to the stellate design of the cavity 3, the second tool element 1' can be turned around a rotational angle and then be inserted into the cavity 3, as shown in FIG. 6. In that case, the diameter line D1 of the first tool element 10 lays horizontal, while the diameter line D'1 of the inserted second tool element 1' is arranged with a turned angle of 45° for example clockwise. The diameter line D'1 of an second, turned tool element is depicted in FIG. 6.

By the second tool element 1', inserted into the first tool element 10 according to FIG. 6, being inserted turned around an angle to the center 49, and by the projection 3 being arranged eccentrically, the distance can be changed of a blade on the second tool element 1' compared to the center axis 21 of the first tool element 10. It is thus possible, in case of an eccentric arrangement of the projection 3, to realize different working diameters.

FIG. 6 explains, that the rotating of the diameter line D'1 of the second tool element 1', being inserted into the first tool element 10 according to FIG. 6, takes place around the center 49 of the eccentric cavity 3 in the first tool element 10.

It is obvious, that the change of the working diameter when turning the second tool element compared to the first tool element 10 in FIG. 6, is dependant on how the separation of the stellate inner contour 5 of the cavity 3 is designed. With the embodiment shown in FIG. 6, the outer contour comprises eight projections 51, wherein the projections of the second tool element can engage corresponding to the projections 33 in FIG. 5.

It would be possible to increase the number of projections 51 of the inner contour 5 considerably, such that in case of a relative turn of both of the tool elements to each other, smaller changes of the relative position can be realized than is the case in the embodiment according to FIG. 6.

FIG. 6 indicates for example a knife blade 53 with a blade 55, being mounted on the second tool element and arranged on the diameter line D1. As the first tool element 10 revolves around the center axis 21, the blade 55 lays on an orbit with the radius r1 and the blade has a distance from the center axis 21 of the first tool element 10 equal to the radius r1. When machining a bore with the blade 55, a respective working diameter is thus present.

If the second tool element with the knife blade 55 is removed from the first tool element 10, and reinserted counter clockwise into the first tool element 10, the distance of the blade 55 to the rotational axis 21 changes. FIG. 6 depicts a knife blade 53', turned 135° clockwise with a blade 55'. Here, due to the eccentricity of the cavity 3, the blade 55' is in a distance r2 to the rotational axis 21. Here r2 is >r1.

In case the second tool element, being rotated 180°, is inserted into the first tool element 10, the knife blade 53" is opposite of the knife blade 53. Accordingly, the blade 55" is arranged opposite from blade 55. The blade 55' is at a distance r3 to the diameter line D2. R3 is larger than r2, also larger than r1. The distance r3 of the blade 55" to the diameter line D2 is r1+e.

If a distance of the blade 55 is chosen with an eccentricity e=0.58 mm in the first position to the diameter line D2 with r1=14, 51 mm, the distance r3 in the opposite position is r3=15.67 mm with the blade 55' laying again on the diameter line D1. Regarding the distance of the blade 55' to the rotational axis 21, the following applies: r2=15.52 mm.

It shows, that due to the eccentric arrangement of the cavity 3 in the first tool element 10 with a rotation of a second tool element, the projection 25 thereof being inserted into the cavity 3, the distance r1 of a blade 55 at a rotation of the second tool element at 180° increases to r3.

In the first position the distance of a blade is r1, in a second position r2, and in a third position r3.

In case of a smaller separation of the stellate projection r3, that is to say of the projections on the second tool element, smaller changes of the relative position between both tools can be realized, thus also smaller changes of the distance of a blade to the center axis 21. The change of the radius from r1 to r3 is influenced by a change of the eccentricity e.

A change of the radius, that is the diameter of the orbit of a blade, may be desirable, when bores of different diameters are to be machined, but also, when a blade 55 is worn due to machining of tools.

Furthermore, it is noted, that with a relative turn when assembling the first tool element and a second tool element with a blade 53, a change in the distance of the blade to the center axis 55 can be achieved, when the projection 25 of a second tool element is arranged eccentrically to the center axis 45 thereof. Thus, the cavity 3 and the projection 25 can be arranged eccentrically.

Furthermore, it is pointed out, that it is not relevant for an interface, whether a cavity 3, as usual, is intended on a tool spindle and a projection to be mounted on a tool element is intended, or vice versa. On the one hand, a higher torque can be transmitted by a special embodiment of the cavity 3 and the projection 25, on the other hand, the change of the orbit of a blade of the second tool element is possible with an embodiment according to FIG. 6.

If an interface as discussed here, has a recess with a conical recess region 23 and the projection 25 has a conical projection region 38, the main torque is transmitted via said conical regions. Peak moments are transmitted by interlocking between cavity 3 and the projection region 42, comprising the herewith discussed inner- or outer contour.

With an interface, comprising the first tool element 1 or 10 and the second tool element 1', it can be intended, that both tool elements can only be inserted into each other in a defined rotational position. This can be achieved, by the separation of the inner contour of the cavity 3 and the one on the projection 25 or 25' being different. With an appropriate configuration, it can be guaranteed that the projection can only be inserted into the recess at a certain rotational position.

It is also possible, to provide a pin or the like to a tool element in the region of contact of both tool elements, or to provide a recess to the other tool element. This ensures, that both tool elements can only be joined, when the pin grips into the recess. This leads to a defined rotational angle position of both tool elements.

A position of that kind can become relevant on the one hand, for aligning the coolant-/lubricant channels opening into the planar surfaces with each other, or on the other hand, to make sure, that provided blades on the first tool element are in a certain position compared to guide rails or blades on the second tool element. With a certain arrangement of both tool elements in the region of the interface, it can be guaranteed, that chip—or lubricating grooves, intended on the peripheral surface of the tool elements, are aligned with each other in the assembled state of the interface.

From the explanations of FIGS. 1 to 6 it becomes obvious, that the interface, wherein two tool elements are joined in the region thereof, is constructed in a simple way and ensures the transmission of a high torque. From FIGS. 1 to 3 it becomes obvious, that with an appropriate configuration of the cavity 3, a tool element having said cavity, can be used universally, as on the one hand, polygonal, on the other hand, stellate projections can interlock in said recess. It is possible to provide existing tool systems with a first tool element 1, as explained in FIGS. 1 to 3.

The invention claimed is:

1. An interface between a first tool element and a second tool element comprising:
   a projection on one of the first and second tool elements; and
   a cavity on the other of the first and second tool elements accommodating the projection;
   wherein the cavity has an inner contour designed for polygonal and/or stellate projections, the inner contour, looked upon from the inside, comprising two first regions, each first region having first concave sections and second concave sections, the first concave sections having radius of curvature that is different than radius of curvature of the second concave section the inner contour comprising two second regions, each second region having at least a concave first section and at least an adjoining convex second section, and that the two first regions and the two second regions are opposite of each other.

2. The interface according to claim 1, wherein the inner contour has at least one region comprising concave first sections, a plane second section laying in between.

3. The interface according to claim 1, wherein the inner contour has at least one first region, comprising concave first sections, convex second sections laying in between.

4. The interface according to claim 3, wherein the curvature radiuses of the first and second sections of the at least one first region are identical.

5. The interface according to claim 1, wherein the opposite first regions and the opposite second regions are identical.

6. The interface according to claim 1, wherein the inner contour of the cavity being symmetrical to a first diameter line and to a second diameter line running perpendicular on the first diameter line.

7. The interface according to claim 1, wherein a recess in the first tool element and/or the projection of the second tool element is arranged eccentrically relative to a central axis of the first or second tool element.

8. The interface according to claim 1, wherein the projection and the cavity each have a cone-envelope-shaped region.

9. The interface according to claim 7, wherein the projection and the recess each comprise at least one cylindrical region.

10. The interface according to claim 9, wherein the inner contour of the cavity is intended for the at least one cylindrical region of the cavity.

11. The interface according to claim 1, wherein the tool elements comprise planar surfaces surrounding the projection or the cavity.

12. The interface according to claim 1, further comprising at least one coolant/lubricant channel.

13. The interface according to claim 12, wherein the at least one coolant-/lubricant channel comprises partial channels opening into planar surfaces.

14. The interface according to claim 12, further comprising an alignment device enabling connection of an interface of two assigned tool elements only in a defined rotary position.

15. The interface according to claim 1, wherein a separation of the inner contour of the cavity and of the projection are different, ensuring a defined rotary angle position of the tool elements assigned to the interface.

16. A first tool element comprising:
  a cavity designed to receive a projection on a second tool element;
  wherein the cavity has an inner contour, looked upon from the inside, the inner contour comprising two first regions, each first region having a concave first section and a concave second section, the first concave section having radius of curvature that is different than radius of curvature of the second concave section, the inner contour comprising two second regions having at least a concave first section and at least an adjoining convex second section, the two first regions being opposite of each other, and the two second regions being opposite of each other.

17. The first tool element of claim 16, wherein the two first regions have at least two concave first sections, and the concave second sections of the two first regions are disposed between and adjoining the at least two concave first sections.

18. The first tool element of claim 17, wherein the first and second sections of the two first regions have different curvature radiuses.

\* \* \* \* \*